US009920560B2

United States Patent
Gipson et al.

(10) Patent No.: US 9,920,560 B2
(45) Date of Patent: Mar. 20, 2018

(54) WINDOW ASSEMBLY WITH A MOVABLE PANE AND A DEFROST ASSEMBLY

(71) Applicant: Dura Operating, LLC, Auburn Hills, MI (US)

(72) Inventors: Ronnie G. Gipson, Metamora, MI (US); Kenneth E. Keck, II, Clinton Township, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 129 days.

(21) Appl. No.: 15/075,737

(22) Filed: Mar. 21, 2016

(65) Prior Publication Data

US 2017/0268272 A1    Sep. 21, 2017

(51) Int. Cl.
| | | |
|---|---|---|
| *B60J 1/18* | (2006.01) | |
| *E05D 15/06* | (2006.01) | |
| *E06B 3/46* | (2006.01) | |
| *H05B 3/84* | (2006.01) | |
| *H05B 3/03* | (2006.01) | |

(52) U.S. Cl.
CPC ........ *E05D 15/0682* (2013.01); *B60J 1/1853* (2013.01); *E05D 15/0691* (2013.01); *E06B 3/4609* (2013.01); *E06B 3/4618* (2013.01); *H05B 3/03* (2013.01); *H05B 3/84* (2013.01); *E05Y 2900/50* (2013.01)

(58) Field of Classification Search
CPC ............. E05D 15/0682; E05D 15/0691; E06B 3/4618; E06B 3/4609; H05B 3/84; B60J 1/1853
See application file for complete search history.

(56) References Cited

U.S. PATENT DOCUMENTS

| 3,331,428 | A | * | 7/1967 | Ford | ................ | A47H 5/06 |
| | | | | | | 160/331 |
| 3,374,823 | A | * | 3/1968 | Ford | ................ | A47H 5/00 |
| | | | | | | 160/331 |
| 5,799,449 | A | * | 9/1998 | Lyons | ................ | B60J 1/16 |
| | | | | | | 296/146.1 |

(Continued)

OTHER PUBLICATIONS

EP Extended Search Report for EP Application No. 17161064.5 dated Aug. 24, 2017, 8 pages.

*Primary Examiner* — Katherine W Mitchell
*Assistant Examiner* — Abe Massad
(74) *Attorney, Agent, or Firm* — Reising Ethington P.C.; Matthew J. Schmidt; Robert E. Ford

(57) ABSTRACT

In at least some implementations, a motor vehicle window assembly includes a guide rail, a movable pane movable along the guide rail between open and closed positions and a defroster. First and second guide rail conductors are carried by the guide rail and adapted to be connected to a power source. First and second movable conductors are each electrically communicated with a respective one of the first and second guide rail conductors, each electrically coupled to the defroster and each movable with the movable pane relative to guide rail when the movable pane is moved between the open and closed positions. To provide power to the defroster, the movable conductors are in contact with the guide rail conductors when the movable pane is in the closed position and during movement of the movable pane between the open and closed positions.

19 Claims, 8 Drawing Sheets

(56) References Cited

U.S. PATENT DOCUMENTS

| | | | |
|---|---|---|---|
| 6,581,332 B1 * | 6/2003 | Kim | E05F 15/635 49/358 |
| 6,883,279 B2 * | 4/2005 | Fukuro | E06B 3/4609 49/408 |
| 7,504,788 B2 * | 3/2009 | Haab | E05F 15/632 160/1 |
| 7,578,096 B2 * | 8/2009 | Haab | E05F 15/638 16/87 R |
| 8,402,695 B2 | 3/2013 | Smith et al. | |
| 8,881,458 B2 * | 11/2014 | Snider | B60J 1/1853 49/213 |
| 8,915,018 B2 * | 12/2014 | Snider | B60J 1/1853 49/380 |
| 2010/0122495 A1 | 5/2010 | Lahnala | |
| 2010/0154312 A1 | 6/2010 | Gipson et al. | |
| 2012/0117880 A1 | 5/2012 | Lahnala | |
| 2012/0291353 A1 | 11/2012 | Gipson et al. | |
| 2013/0019532 A1 | 1/2013 | Ash, Jr. et al. | |
| 2013/0038093 A1 | 2/2013 | Snider | |
| 2013/0174488 A1 | 7/2013 | Snider et al. | |
| 2015/0052814 A1 | 2/2015 | Snider et al. | |

* cited by examiner

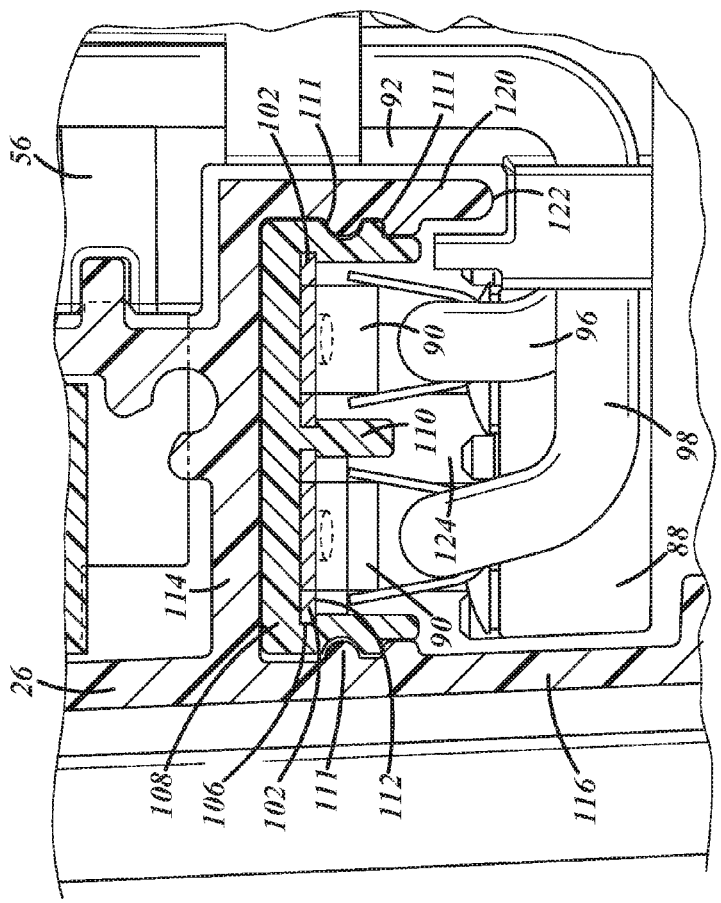
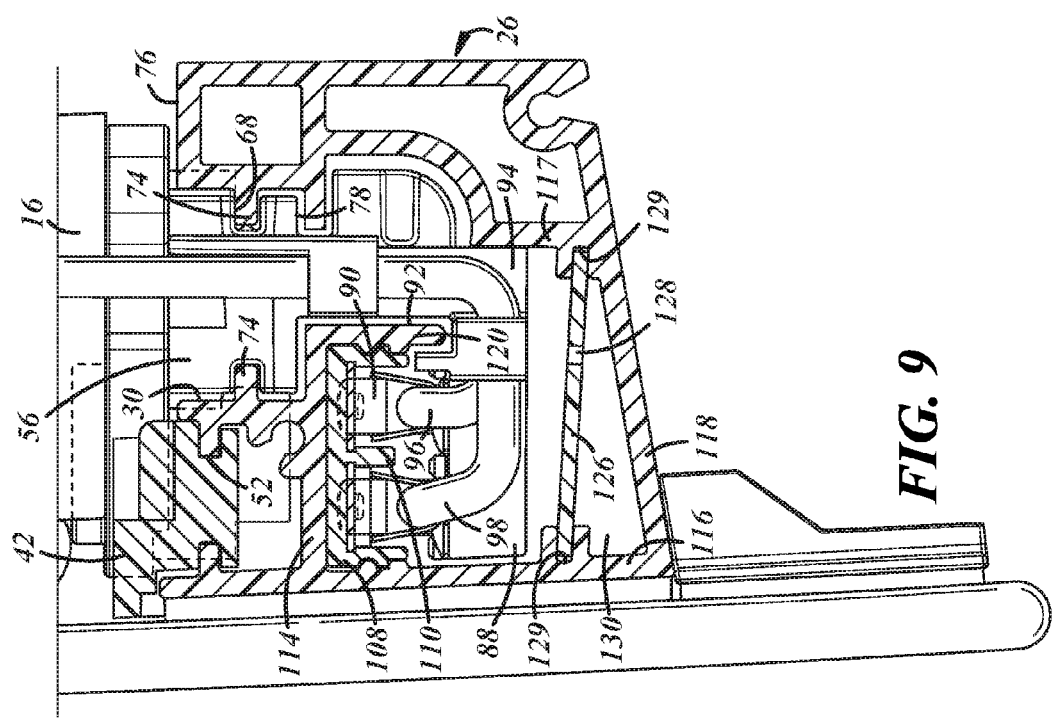
FIG. 10
FIG. 9

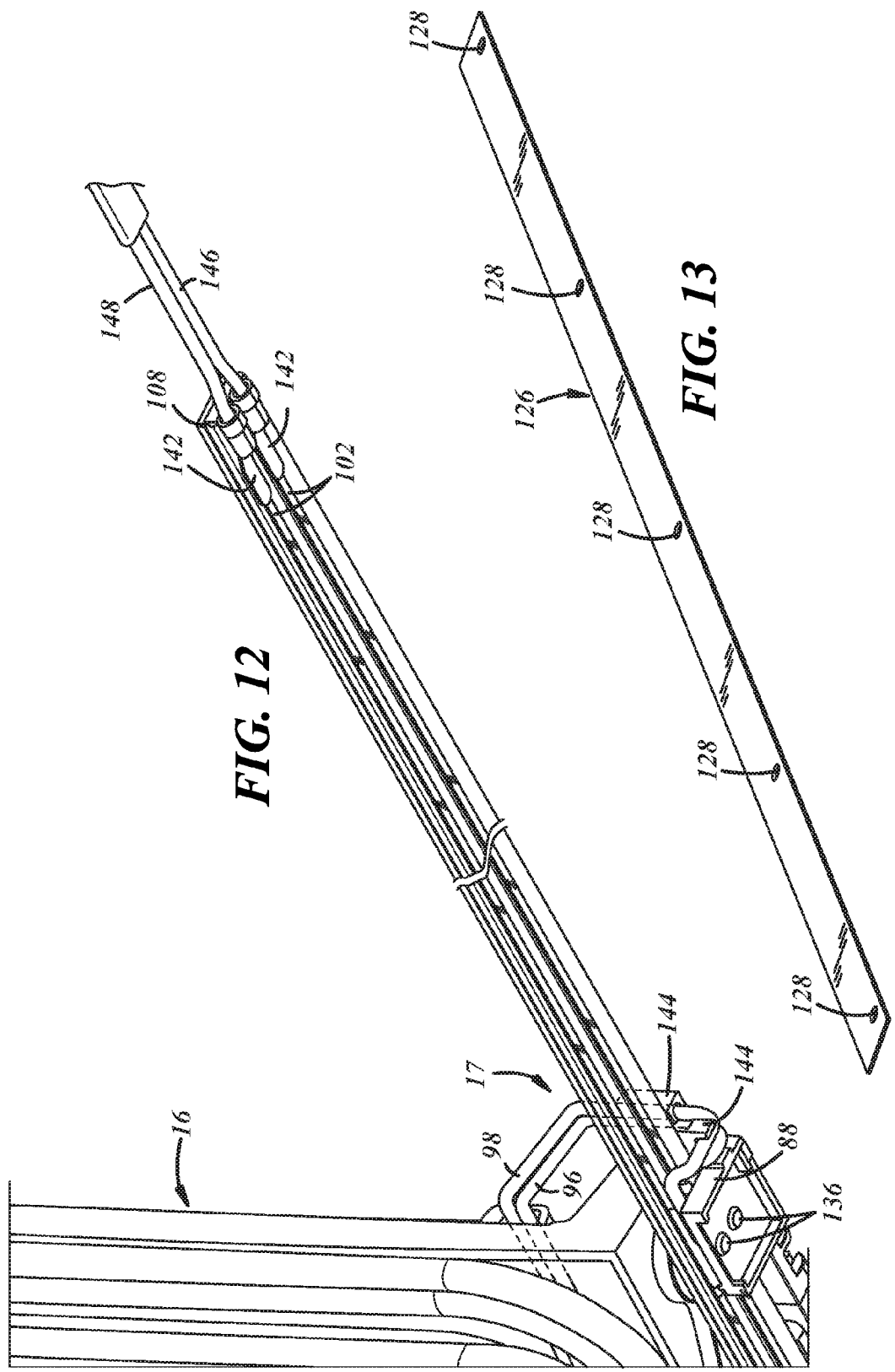

WINDOW ASSEMBLY WITH A MOVABLE PANE AND A DEFROST ASSEMBLY

TECHNICAL FIELD

The present disclosure relates to a window assembly with a movable pane that, in at least some implementations, includes a defrost assembly.

BACKGROUND

Pickup trucks may include a rear window assembly that defines part of a passenger compartment of the vehicle. The window assembly may include a movable pane that selectively closes an opening to the exterior of the vehicle. The movable pane may be driven by an actuator or manually opened. Some movable panes are flush with adjacent fixed panes when the movable pane closes the opening. These movable panes have a compound motion or path of travel between their open and closed positions that permits the movable pane to move into and out of plane with the fixed panes so that the movable pane can be laterally moved relative to the fixed panes and the opening. It can be difficult to reliably close the movable pane against seals surrounding the opening, and to control compound movement of a flush sliding window.

SUMMARY

In at least some implementations, a motor vehicle window assembly includes a guide rail, a movable pane movable along the guide rail between open and closed positions and a defroster. First and second guide rail conductors are carried by the guide rail and adapted to be connected to a power source. First and second movable conductors are each electrically communicated with a respective one of the first and second guide rail conductors, each electrically coupled to the defroster and each movable with the movable pane relative to guide rail when the movable pane is moved between the open and closed positions. To provide power to the defroster, the movable conductors are in contact with the guide rail conductors when the movable pane is in the closed position and during movement of the movable pane between the open and closed positions.

In at least some implementations, a motor vehicle window assembly may include a guide rail, a movable pane that moves along the guide rail between open and closed positions, a defroster carried by the movable pane, a power supply and conductors connected between the power supply and movable pane. The guide rail includes a flange that defines at least part of a conductor chamber, a guide rail conductor is carried by the guide rail within the conductor chamber and the power supply is coupled to the guide rail conductor. A movable conductor is electrically communicated with the defroster and coupled to the movable pane for movement with the movable pane, and the movable conductor is in contact with the guide rail conductor when the movable pane is in the closed position and during movement of the movable pane between the open and closed positions. The guide rail conductor is located in a portion of the conductor chamber that is separated from a liquid flow path in the guide rail by the flange.

A motor vehicle window assembly may include a guide rail and a movable pane. The guide rail may have generally opposed sidewalls, a drain passage formed in the guide rail through which fluid may flow out of the guide rail and a wall extending between the sidewalls. The movable pane is movable along the guide rail between a closed position and an open position. The wall that extends between the sidewalls and is received between an upper surface of the guide rail and the drain passage. The drain wall may be formed from a different material than the guide rail, and may include a drain opening offset from the drain passage to provide a circuitous fluid path through the guide rail.

Other embodiments can be derived from combinations of the above and those from the embodiments shown in the drawings and the descriptions that follow. Further, within the scope of this application it is envisaged that the various aspects, embodiments, examples, features and alternatives set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

The following detailed description of preferred implementations and best mode will be set forth with regard to the accompanying drawings, in which:

FIG. 1 shows the movable window in its closed position wherein the movable pane closes the opening and FIG. 2 shows the movable window in an open position with at least part of the opening exposed;

FIG. 9 is a fragmentary sectional view of a portion of the lower guide rail, cam and trolley;

FIG. 10 is an enlarged, fragmentary sectional view of a portion of FIG. 9;

FIG. 12 is a fragmentary perspective view showing part of the defrost assembly including guide rail conductors; and FIG. 13 is a perspective view of a drain wall.

DETAILED DESCRIPTION

Figure 1:
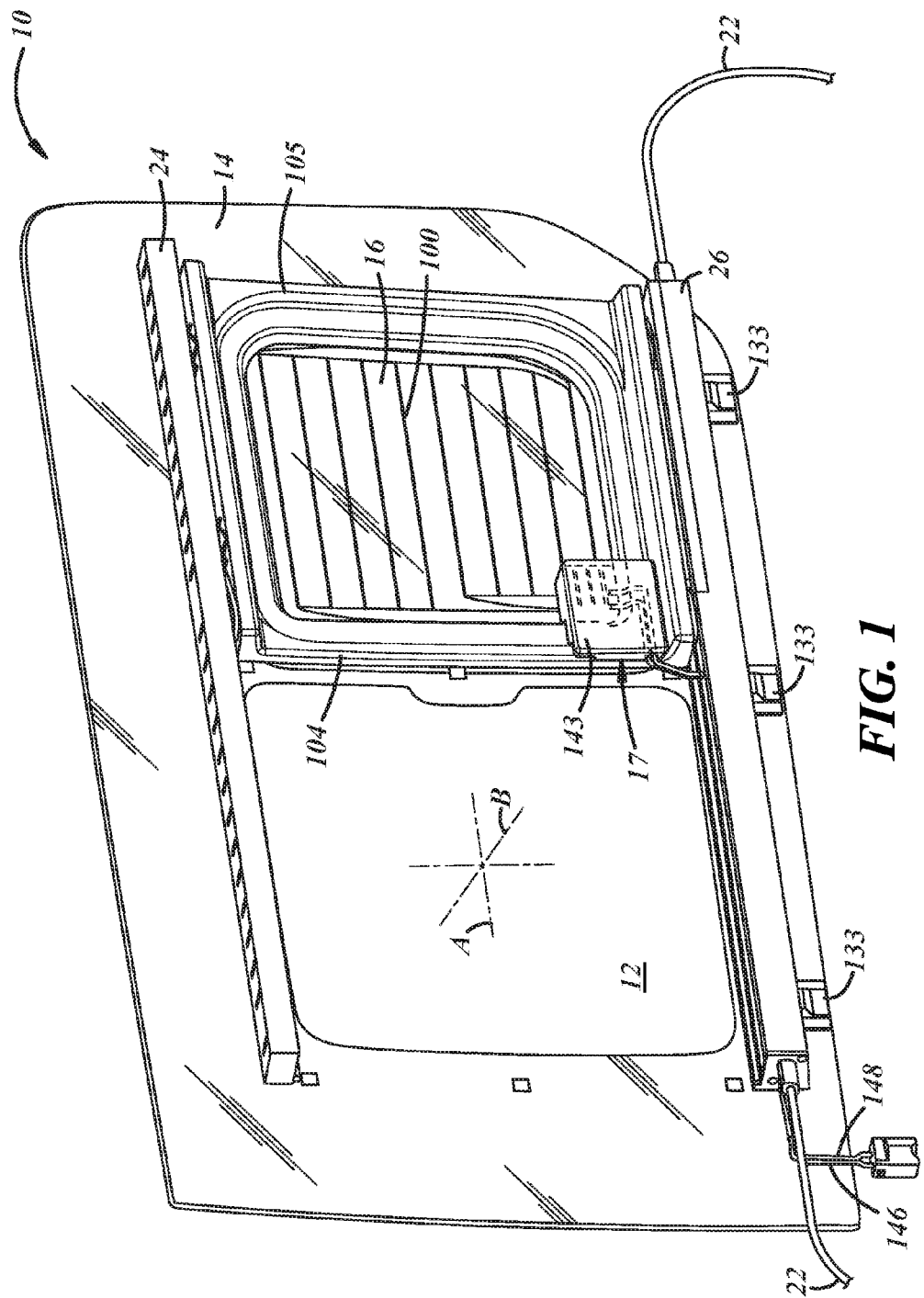
FIGS. 1 and 2 are perspective views of a window assembly having a fixed pane and a movable pane that moves relative to an opening to selectively close or cover the opening.
Figure 2:
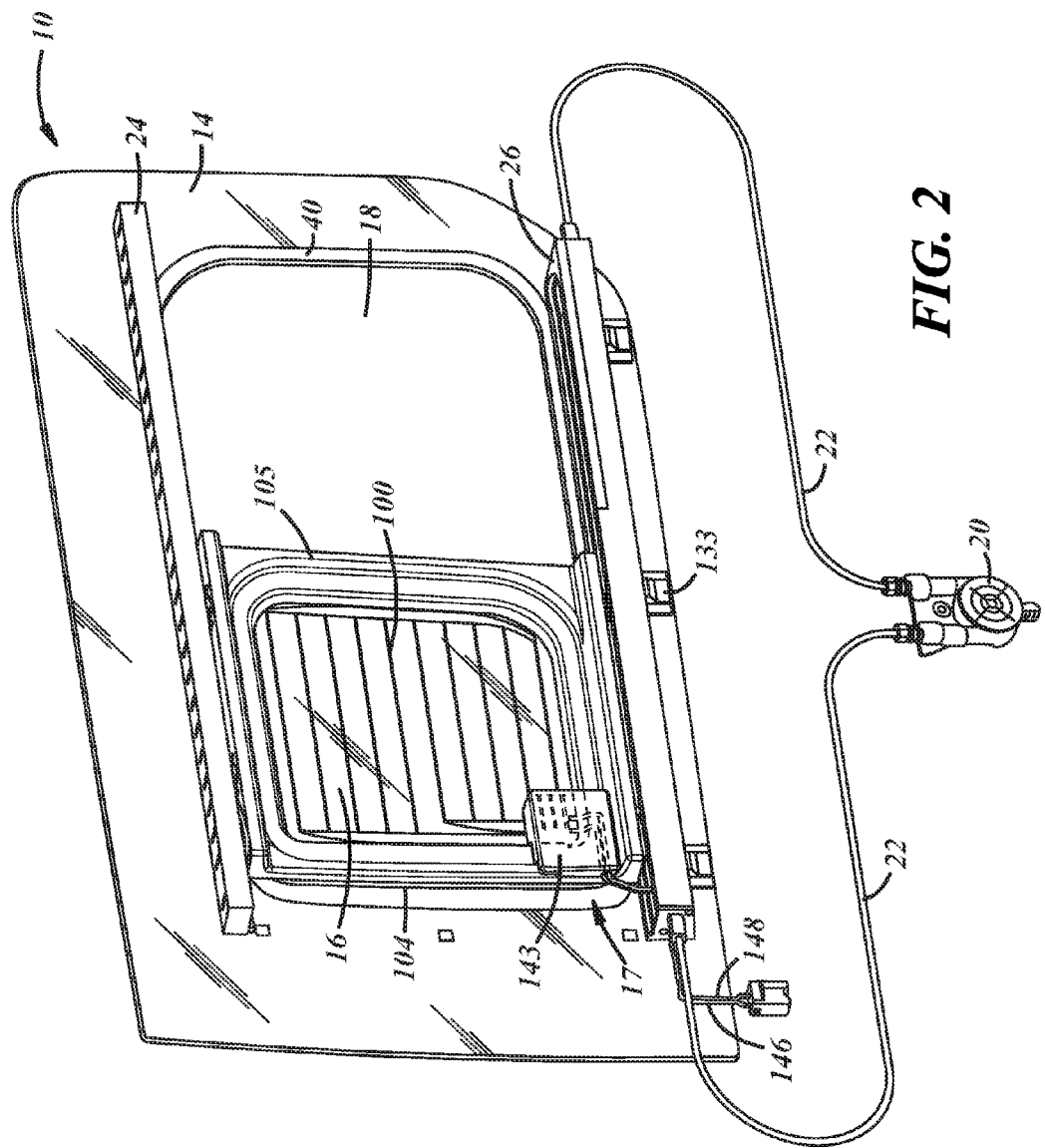

In general, this description includes various example implementations of a motor vehicle window assembly 10. As shown in FIGS. 1 and 2, the window assembly 10 may include one or more fixed panes 12 that do not move when installed on a vehicle and one or more movable windows or window panes 16 that do move after installation on a vehicle. The window assembly may be used as a rear window for a pick-up truck passenger compartment. The window assembly 10 may be a frameless, one-piece fixed pane type of backlight of a pickup truck, or any other suitable type of window assembly including, but not limited to, a backlight having a frame 14 carrying one or more fixed panes. The window assembly 10 may also include a defrost assembly 17 and electrical power may be provided to the defrost assembly, as set forth below, even as the movable pane 16 moves between its open and closed positions.

In at least some forms, the window assembly 10 includes one or more fixed panes (in FIGS. 1 and 2, one fixed pane 12 is shown), an opening 18 (FIG. 2) defined in the fixed pane 12 or between the fixed pane and a frame 14 of the assembly 10, and a movable window 16 that is moved relative to the opening 18. The movable window 16 may have a closed position wherein the movable window fully overlaps or closes the opening 18 to prevent wind and water passing through the opening, and an open position wherein the movable window is moved from its closed position and only partially overlaps or does not overlap the opening at all.

The movable window 16 may be moved in any suitable manner by any suitable means. For example, as shown in FIGS. 1 and 2, the window assembly 10 also may include an actuator 20 and one or more actuator cables 22 coupled to the actuator 20 and to the movable window assembly 18 to open and close the movable window assembly 18. In one implementation, the actuator 20 may be electrically powered and may include, for example, an electric motor and a cable-drum window regulator including the cables 22.

Figure 3:
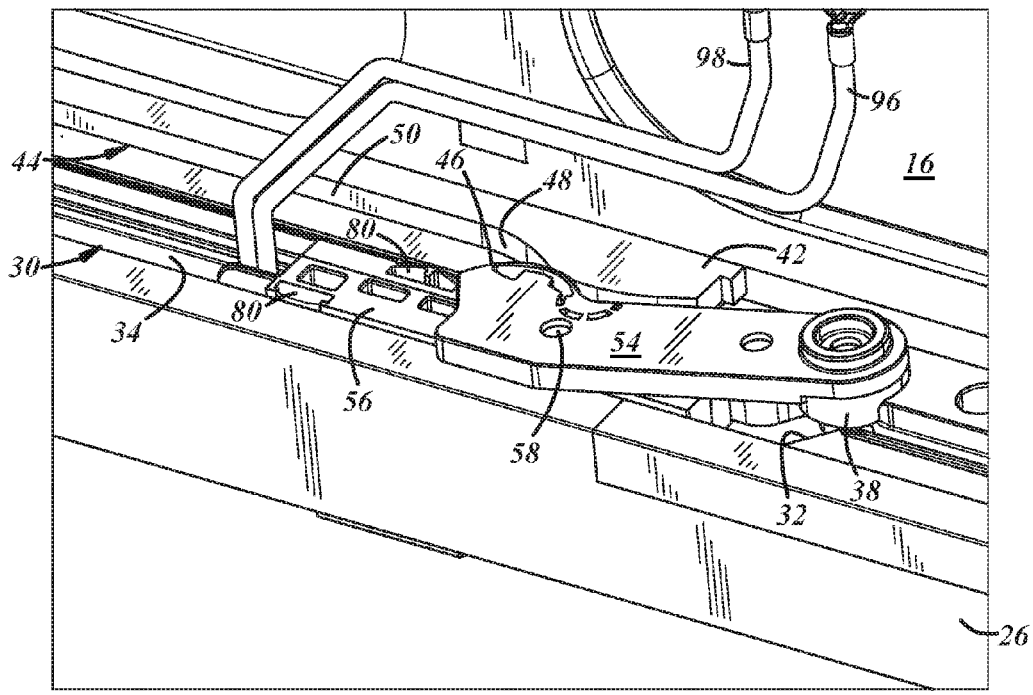
FIG. 3 is a perspective view of a portion of a lower guide track with the movable pane removed to better show a guide follower, follower body and trolley that move with the movable pane, the components being shown in positions they are in when the movable pane in its closed position.
Figure 4:
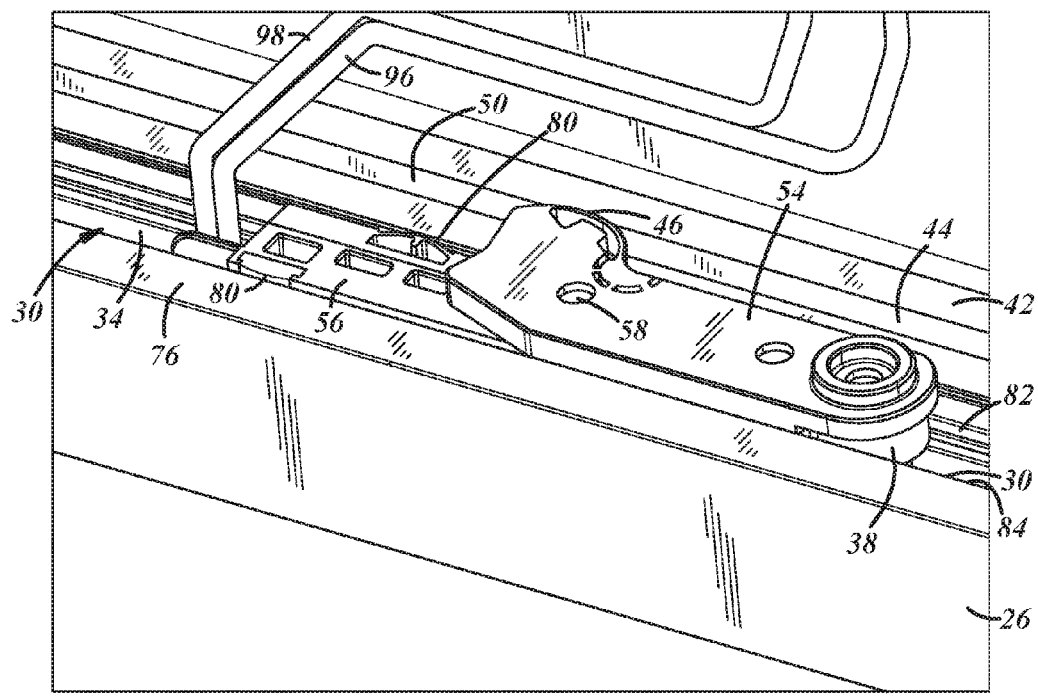
FIG. 4 is a view similar to FIG. 3 but showing the components in positions they are in when the movable pan is moved away from its closed position and at least partially open.
Figure 5:
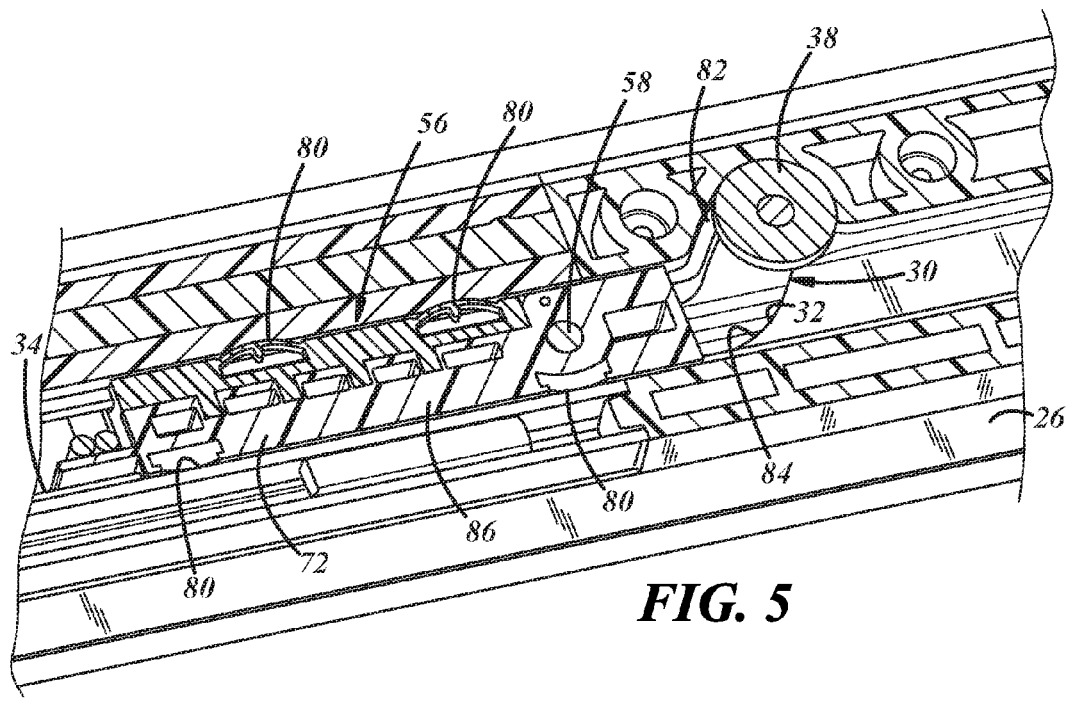
FIG. 5 is a sectional view showing a portion of the guide track, the trolley and the guide follower in the position of FIG. 3.

As shown in FIGS. 1 and 2, the window assembly 10 may include both an upper guide rail 24 and a lower guide rail 26. The innovations set forth herein could be implemented in either or both of the guide rails 24, 26. For ease of description, the remainder of this disclosure will be directed to the lower guide rail 26. The guide rail 26 may include a guide track 30 (FIGS. 3-5). Components coupled to with the movable pane 16 are received in or adjacent to the guide track 30 to control the path of travel of the movable pane between its closed and fully open positions.

In some implementations, the guide track 30 may define, and the movable pane 16 may move along, a contoured path providing a so-called flush sliding window assembly wherein the movable pane 16 is flush with the fixed pane(s) when closed. In such implementations, when the movable pane 16 is moved away from its closed position, the movable pane 16 must move either inwardly toward or outwardly away from the passenger compartment before or as the movable pane 16 is moved laterally to uncover at least part of the opening 18. To provide this compound movement of the movable pane 16, the guide track 30 has at least a portion 32 (FIGS. 3 and 5) that is not linear or straight and is curved and a second, straight portion 34 extending from the curved or contoured portion 32.

The compound movement of the movable pane 16 has a first component generally perpendicular to a plane including the fixed pane 12 (called "transverse" herein and generally along line or plane B in FIG. 1) and a second component generally parallel to that plane (called "lateral" herein and generally along line or plane A in FIG. 1). While the terms "plane" and "planar" are used herein, it is recognized that the fixed pane 12 and/or the movable pane 16 may have some curvature, that is, they might not be flat or planar. Nonetheless, they may be considered to be in the same general alignment or plane in the closed position shown in FIG. 1 even if they are not entirely within any given plane. This compound movement both moves the movable pane 16 transversely out of plane with the fixed pane 12 and also laterally relative to the fixed panes 12. To control this compound movement, a guide follower 38 may be coupled to the movable pane 16 and received within the guide rail 26 to ride along the guide track 30 to provide a desired path of motion for the movable pane. As noted above, a similar arrangement may be provided in the upper guide rail 24.

In the closed position of the movable pane 16, the window engages seals 40 (shown diagrammatically in FIG. 2) to provide a substantially air and water tight interface to prevent or greatly inhibit air and water intrusion into the passenger compartment around the movable window. If the seals 40 are not sufficiently engaged, wind noise may be elevated and/or water may enter the passenger compartment. To assist in fully closing the movable pane 16, a force assist member 42 may be provided.

As shown in FIG. 3, force assist member may include a cam 42 having a cam surface 44 adapted to be engaged by a cam follower 46 associated with the movable pane 16. The cam surface 44 of this cam 42 may include an inclined or curved portion 48 that is arranged to help guide or steer the movable pane 16 when the movable pane is near its closed position, and to help transversely displace or pivot the movable pane 16 into its closed position engaged with the seals 40. The cam surface 44 in this implementation also includes a linear or straight portion 50 that may extend a length equal to at least a majority of the length of the travel path of the movable pane 16 and up to the entire length of the travel path. The cam surface 44 may generally mimic the shape of the guide track 30, and in the implementation shown wherein the movable pane 16 moves in a generally straight line after initial opening movement of the movable pane, the cam surface 44 may be generally linear other than in the curved portion 48. So in this implementation, the cam surface 44 is arranged to be engaged by a cam follower 46 even along a flat or not transversely contoured section of the cam surface 44.

In use, as the movable pane 16 is moved toward and away from its closed position, the cam follower 46 engages the cam surface 44. This provides guidance for the movable pane 16 in addition to the guide follower 38 and any similar components within the guide track 30. The engagement of the cam follower 46 with the cam surface 44 over a longer portion of the travel path may also transversely bias the movable pane 16 and associated components relative to the guide track 30 (e.g. toward one side surface of the guide track) and reduce vibrations and noise in the window assembly 10.

Figure 11:
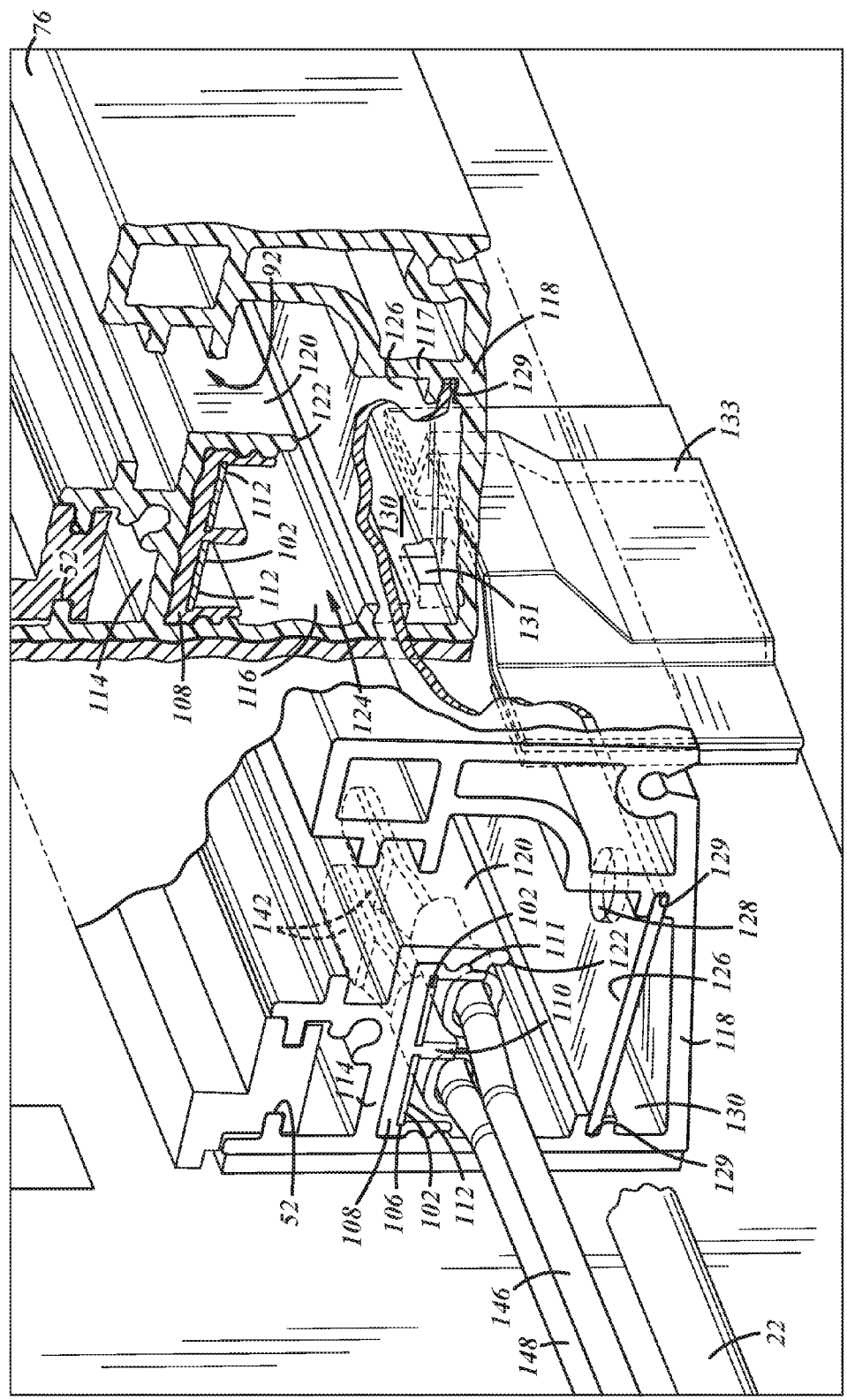
FIG. 11 is an end view of the guide rail and a portion of the defrost assembly, with a portion broken away and in section to show, among other things, a liquid drain path.

The cam 42 may be integrally formed in the guide rail 26 (e.g. as a surface of the guide rail when the guide rail is extruded) or the cam 42 may be a separate component carried by the guide rail. As shown in FIGS. 9 and 11, the cam 42 and guide rail 26 may include complementary flanges and slots (both shown at 52) to retain the cam on the guide rail. The cam 42 may be slid into place from an end of the guide rail 26 after the guide rail is formed. When the cam 42 is not integral with the guide rail 26, the same guide rail construction can be used with different cams to reduce the number of parts needed across a range of different window assemblies 10.

In the implementation shown, a follower body 54 includes or carries the cam follower 46 and is coupled to the lower guide follower 38 at a location spaced from the cam follower 46. When the guide follower 38 is within the straight portion 34 of the guide track 30 (i.e. the guide follower 38 has moved beyond the curved portion 32 of the guide track), the cam follower 46 is engaged with the cam surface 44. Hence, the cam follower 46 is engaged with the cam surface 44 during some portion of the linear, lateral travel of the movable pane 16, and the corresponding linear portion 50 of the cam surface 44 is at least equal to the length of the follower body 54.

Next, as shown in FIGS. 3 and 4, the follower body 54 may be coupled to a trolley 56 at a pivot 58, as described in the prior window assembly 10. The pivot 58 may be located between the cam follower 46 and the guide follower 38. The cam follower 46 may be integrated with the follower body 54, such as by being defined by a surface of the follower body that generally faces the cam surface 44.

FIGS. 5-8 illustrate one implementation of a trolley 56 that is coupled to the movable pane 16 and moves within the lower guide rail 26 as the movable pane moves. Among other things, the trolley 56 may help support and guide the movable pane 16, and may be coupled to the actuator 20 via one or more cables 22 that drive the movable pane 16 between its open and closed positions, as described with regard to the window assembly 10.

Figure 6:
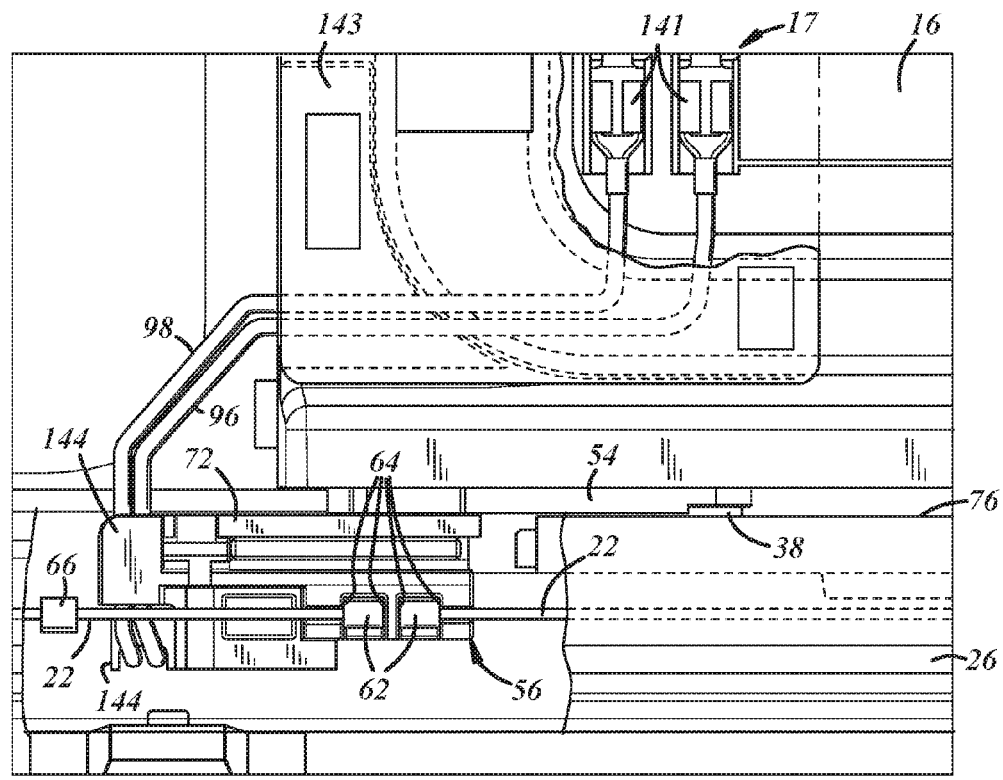
FIG. 6 is a front view of a portion of the lower guide track and movable pane showing the trolley and a portion of a defrost assembly.
Figure 7:
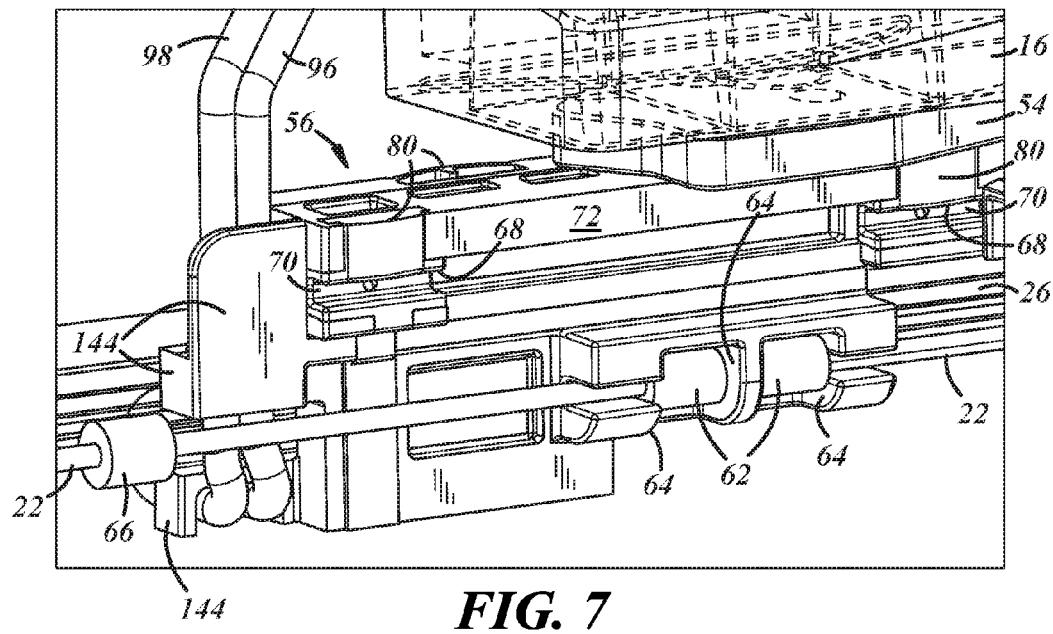
FIG. 7 is a perspective side view of the trolley.

As shown in FIGS. 6 and 7, beads or other stops 62 on the cable 22 may be associated with opposing stop surfaces 64 on the trolley 56 to enable the trolley to be pulled and/or pushed in two opposed directions to move the movable pane 16 between its open and closed positions. If desired, end stops 66 may be provided on or otherwise associated with the cable 22 separately from the trolley 56. These end stops 66 may limit the movement of the movable pane 16 by engaging stop surfaces at the ends of the travel path as previously described, and may be adjustable if desired, for improved control on the position of the ends of the travel path.

Figure 8:
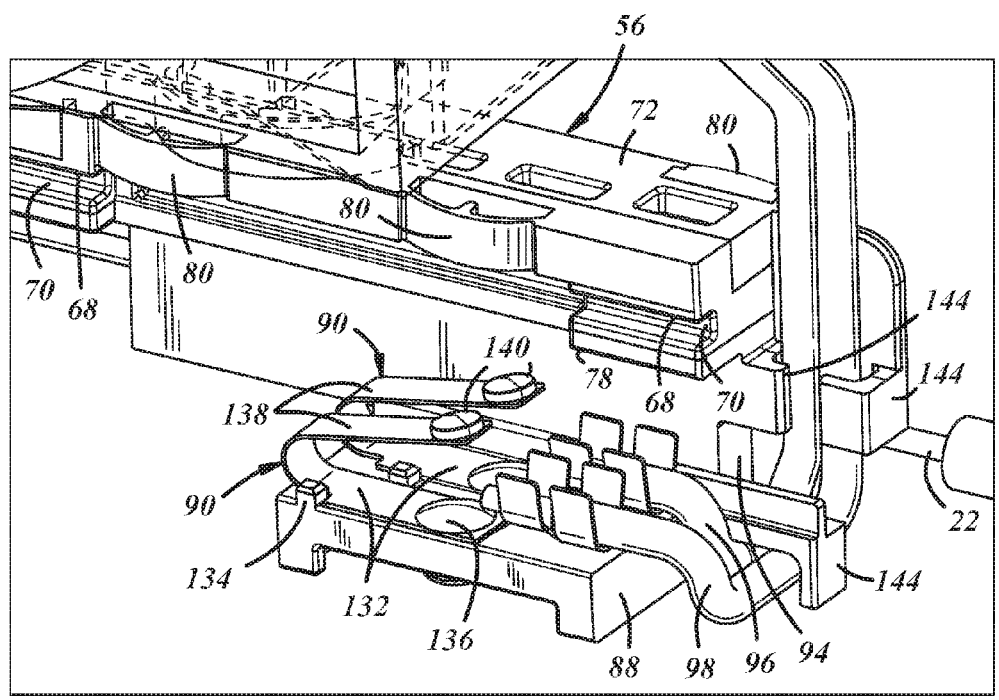
FIG. 8 is a perspective view of the opposite side of the trolley showing a conductor body and electrical conductors for the defrost assembly.

As the trolley 56 and movable pane 16 (which is coupled to the trolley as noted above) are driven by the actuator 20 and cables 22, the guide follower 38 and trolley 56 move within the lower guide track 30 and movement of the movable pane 16 is controlled along the predetermined travel path established by the guide track. The trolley 56 is spaced from the guide follower 38, and in at least some implementations, does not move through the transversely curved portion 32 of the lower guide track 30 and instead remains in the straight, laterally extending portion 34. In this way, the trolley 56 can be elongated (as it does not move through curves or bends) and provide bearing surfaces 68 for smooth movement of the movable pane 16. In the implementation shown, the bearing surfaces 68 include or are surfaces within in slots or grooves 70 formed in the trolley main body 72, as shown in FIGS. 6-8. Multiple discrete bearing surfaces 68 may be provided spaced along the trolley body 72, on opposed sides of the body.

The grooves 70 may receive inwardly extending flanges 74 (FIG. 9) of the guide rail 26, preferably located beneath an upper surface 76 of the guide rail 26 and within the guide track 30 so that the flanges are spaced from the movable pane 16. The flanges 74 may be formed in one piece with the guide rail 26, such as by forming the guide rail by extrusion. The flanges may constrain lateral movement of the trolley 56 and guide the trolley for lateral movement along the straight portion 34 of the guide track 30. The trolley body 72 may be supported on the flanges 74 so that a lower surface 78 of the trolley body 72 does not engage or drag against the guide rail 26. In this way, the trolley body 72 and may be considered to hang on the flanges 74 at bearing surfaces 68 defined in the upper surface of the grooves 70. To further reduce friction, the surface area of the grooves 70 may be made relatively small so that the trolley body 72 engages the flanges 74 over a limited surface area. The lower surfaces of the grooves 70 may overlap a lower edge of the flange 74 to restrain upward movement of the trolley body 72.

Inner surfaces of the grooves 70 may limit movement of the trolley body 72 transversely relative to the flanges 74, and biasing members 80 may also be provided to control transverse movement of the trolley 56 and damp vibrations that might otherwise propagate between the trolley and guide rail 26. In the implementation shown, multiple biasing members 80 are carried by the trolley 56 and extend transversely outwardly toward and into engagement with oppositely facing surfaces 82, 84 of the guide track 30. The biasing members 80 may be integrally formed in one piece with the trolley body 72 to limit the number of pieces in the assembly and reduce assembly time. The biasing members 80 may include flexible and resilient strips of material and/or resilient cantilevered fingers, or any other arrangement of a flexible and resilient component or surface. In at least some implementations, at least one biasing member 80 may remain in contact with the guide rail 26 throughout the range of motion of the movable pane 16. This may inhibit rapid movement of the trolley 56 toward or away from surfaces 82, 84 of the guide track 30 and thereby reduce vibrations or rattling of the trolley relative to the guide rail.

In at least some implementations, as shown in FIGS. 5 and 9, the trolley body 72 may include a base 86 formed of a first material and at least partially overmolded with a second material. The base 86 may be coupled to the cables 22 and hence, should be made from a material that can handle the forces and stresses associated therewith. In the implementations shown, the base is formed from a reinforced plastic (e.g. glass-filled nylon) or a metal, such as aluminum. The overmolded material may be arranged to engage the guide rail 26, such as by defining the biasing members 80 and bearing surfaces 68, and so the second material may be chosen to provide a desired reduced frictional engagement with the guide rail. In the implementation shown, the second material is acetal although other polymers, composites or a metal may be used.

As shown in FIGS. 8-10, the trolley body 72 may further include or be connected to a conductor body 88 including at least one electrical conductor 90 (two are shown in this implementation) for the defrost assembly 17. The conductor body 88 may extend transversely from the trolley body 72. In the implementation shown, the guide track 30 includes and is at least partially defined by transversely spaced apart surfaces 82, 84 and the guide rail 26 may include a slot 92 open to the guide track 30 (e.g. the area between the surfaces 82, 84). An intermediate portion 94 of the trolley body may extend vertically through the slot 92 and interconnect the conductor body 88 and the main body 72 which generally are located on opposite sides of the slot 92 (above and below the slot). The conductor body 88 and main body 72 may be formed in one piece, or be otherwise coupled together for movement together as the movable pane 16 moves.

The conductors 90 are carried by the conductor body 88 and thus, move with the trolley body 72 as it moves relative to the guide rail 26. The conductors 90 movable with the trolley relative to the guide rail 26 will hereafter be called movable conductors. In at least some implementations, two movable conductors 90 are provided with one being coupled to a power wire 96 and one being coupled to a ground wire 98 of the defrost assembly 17. Thus, the movable conductors 90 are electrically separate but part of the same circuit that provides power to a defroster which may include a grid 100

(FIGS. 1 and 2) or other electrically responsive member for defrosting the movable pane 16.

As shown in FIGS. 9-11, the electrical circuit for the defrost assembly 17 also includes at least one guide rail conductor 102 (two are shown) carried by the guide rail 26 in contact with the movable conductors 90. The guide rail conductors 102 may extend the full length of the path swept by the movable conductors in use of the movable pane 16, which may be determined by comparison of FIGS. 1 and 2. In this way, the power supply to the defrost grid 100 can be maintained throughout the full length of travel of the movable pane 16. The trolley 56, conductor body 88 and movable conductors 90 may move linearly within the guide rail 26 or substantially linearly so that the guide rail conductors 102 may be straight pieces of an electrically conductive material carried by the guide rail 26. In this way, the movable conductors 90 need not move through a curved path, and the guide rail conductors 102 need not be curved, and the complexity of the system can be reduced. Further, the defrost system 17 may be readily adapted to a linearly sliding window that does not close flush with the fixed pane(s) or move in and out one or more planes along its path of travel. Of course, the guide rail conductors 102 could extend along even the curved portion of the guide track 30 and the movable conductors 90 could follow the curved path, if desired.

In at least some implementations, the movable conductors 90 are laterally offset from a trailing edge 104 of the window (defined as the edge that moves into the opening 18 last as the movable pane 16 moves toward its closed position, and opposite to a leading edge 105). The movable conductors 90 are thus not overlied by the movable pane 16 and remain within the linear portion 34 of the guide track 30, and the movable pane 16 pivots relative to the trolley 56 and movable conductors 90 as it moves into and initially out of its closed position as noted above.

In the implementations shown, the guide rail conductors 102 include flat strips of electrically conductive material, for example, copper. The strips of material are carried by and may be fixed relative to the guide rail 26 in any suitable manner. In the example shown, the conductors 102 are slid into grooves 106 formed in a carrier 108 so that the conductors 102 are overlapped by portions of the carrier 108 and thereby held in place. The carrier 108 may be formed of an electrically insulating material to insulate the conductors 102 from the guide rail 26. The carrier 108 may include an intermediate flange 110 that separates the conductors 102 from each other, and defines part of adjacent channels in which the conductors 102 are received. The carrier 108 and guide rail 26 may include complementary laterally extending grooves and projections (both called out together by reference numeral 111) to retain the position of the carrier 108 relative to the guide rail 26. This may also facilitate assembly of the carrier 108 into the guide rail 26, such as by laterally sliding the carrier into the guide rail from an end of the guide rail. The conductors 102 could be otherwise arranged and otherwise retained relative to the carrier or guide rail (e.g. by solder, weld, adhesive, fasteners (screws, pins, clips, etc) or the like). For a more compact construction, the guide rail conductors 102 may be positioned side-by-side and parallel to each other. The guide rail conductors 102 may also be arranged to limit fouling by contaminants, like water and dirt, that may enter the guide track 30 and guide rail 26 generally.

In at least some implementations, a contact surface 112 of the guide rail conductors 102, which is engaged by the movable conductors 90 to transmit electricity between them, are not facing upwardly (i.e. counter to the direction of the force of gravity). In the example shown, the guide rail conductors 102 are mounted to a lower surface of a guide rail flange 114 and are downwardly facing relative to the direction of gravitational force. The conductors 102 could be otherwise arranged so that the conductors 102 face at a different angle to the direction of gravitational force other than 90 degrees (where facing upwardly may be considered 180 degrees to the direction of gravitational force and facing downwardly may be considered to be at 0 degrees relative to the direction of gravitational force). For example, the guide rail conductors 102 may be arranged on a side wall 116 of the guide rail 26 that is generally parallel to the direction of gravitational force so that the conductors 102 face perpendicular to the direction of gravitational force, or at some other angle not perpendicular to gravity. In this way, water, other liquids or other contaminants are not likely to engage the conductors 102 or remain on the conductors for any length of time. Further, the conductors 102 may be spaced from (and above) a lower surface 118 of the guide rail 26 on which water or other contaminants may collect.

In addition to being spaced from a lower surface 118 of the guide rail 26, the conductors 102 may also be shielded from the flow of water and contaminants to further inhibit fouling of the conductors. In the implementation shown, the conductors 102 are transversely offset and separated from the slot 92 in the guide rail 26 by one or more walls or surfaces of or carried by the guide rail. In the example shown, the walls include flange 114 which extends transversely in the guide rail from sidewall 116, and a downwardly extending flange 120, and the contact surfaces 112 are located above a free or lower end 122 of the flange 120. In this way, the conductors 102 are shielded from the guide track 30 and the slot 92, and water that enters the guide track 30 cannot flow directly onto the conductors 102. In the implementation shown, the downwardly extending flange 120 defines part of a channel or three-sided conductor chamber 124 in which the conductors 102 are received. In the example shown, the conductor chamber 124 is defined by horizontally or transversely oriented flange 114, vertically oriented flange 120 and vertically oriented sidewall 116. The sides 116 and 120 of the chamber 124 extend downwardly beyond the level of the contact surfaces 112, hence, water or other contaminants would have to flow downwardly past the flange 120 and then be directed upwardly (e.g. against gravity) in order to engage the contact surfaces 112.

In this way, the surfaces that define the chamber 124 may be thought of as being inverted, like an upside down U, where upward, downward and the inverted U are described with reference to the direction of gravitational force. While noted as extending downwardly, the sides need not be parallel to the direction of gravitational force in all implementations. The flange or other structure separating the conductor chamber from the guide track or other entry point for water into the guide rail, may be otherwise oriented so that liquid within the guide rail must move at least some distance in a direction against the direction of the force of gravity to engage the guide rail conductors. Hence, in at least some implementations, the conductor chamber could be open downwardly, as shown in FIGS. 9-11, or the conductor chamber could be open sideways (e.g. perpendicular to the force of gravity, or C-shaped) or at some angle in between. In at least some implementations, the contact surfaces 112 face away from the movable pane 16. For example, if the contact surfaces are below or lower than the movable pane (relative to the gravity), the contact surface are not oriented facing upwardly toward the movable pane; if the contact surfaces are provided next to one or both sides of the movable pane (e.g. in the guide track 30), the contact surfaces do not face inwardly toward the movable pane; and if the contact surfaces are provided above or higher than the movable pane, the contact surfaces do not face downwardly toward the movable pane.

To further direct water away from the conductors 102, a drain wall 126 (FIGS. 9, 11 and 13) may be provided at an angle to the force of gravity to drain water away from and out of the chamber 124. At least a portion of the drain wall 126 may be spaced from and above the bottom wall 118 of the guide rail 26 and may include one or more openings 128 through which water and other contaminants may flow into a chamber 130 (FIGS. 9 and 11) between the bottom wall 118 and drain wall 126. As shown in FIGS. 9 and 11, the drain wall may be received within slots 129 formed in and extending along oppositely facing walls 116 and 117 or surfaces of the guide rail, with the slot in one wall higher than the other slot in the other wall so that the drain wall is inclined as noted above. In addition to being inclined to direct water away from the chamber 124 in which the conductors 102 are received, the drain wall 126 may also be inclined toward one end to direct water as desired. The drain wall 126 may be formed from plastic, metal or any desired material and may be formed separately from the guide rail or integrally therewith, such as when the rail is extruded. The drain wall 126 may be generally planar, as shown, or it could be contoured or shaped as desired.

After flowing into the chamber 130, liquid may be routed through one or more openings or passages 131 in the guide rail so that water and other liquid may flow out of the guide rail 26 rather than simply be collected within the guide rail. Drain covers 133 (FIGS. 1, 2 and 11) may be provided at the guide rail drain passages 131 to further guide and control liquid draining from the guide rail 26. The drain covers 133 may define a drain path that may direct fluid as desired, including to an exterior of the vehicle through any desired path. Several drain covers 133 and drain passages 131 may be provided along the lateral length of the guide rail 26, as desired. Hence, the guide rail may define a liquid flow path that is defined at least in part by the guide track 30, slot 92, drain wall openings 128, chamber 130 and passages 132, and the drain covers 133. The conductor chamber 124 may be offset and/or separated from the liquid flow path by one or more surfaces of the guide rail 26. In the implementation shown, the surfaces include flanges 114 and 120. Further, the guide rail conductors 102 may be carried within the conductor chamber 124 at a location above the lower edge of a surface defining the chamber so that liquids are less likely to come into contact with the conductors 102 and instead are more likely to flow down through the drain wall 126.

In addition to defining part of a liquid flow path for directing water or other liquids in the guide rail 26, the drain wall 126 may also damp vibrations and reduce noise emanating from or transmitted through the guide rail. By spanning the area between the opposed walls 116, 117 that define part of the flow path (e.g. by transversely spanning across the flow path), the drain wall 126 blocks direct transmission of noise through the drain passages 131, chamber 130 and slot 92. To improve the sound attenuation, the drain wall openings 128 may be offset from and directly aligned with the drain passages 131. This provides a circuitous path for fluid (e.g. liquid/air) through the guide rail rather than a straight path. Further, in some implementations the drain wall 126 may be formed from a softer material than the guide rail (e.g. a comparatively soft polymer drain wall in an aluminum guide rail), or a material having other properties chosen to damp vibrations and/or reduce sound transmission in or through the guide rail. The drain wall may be provided for the liquid/fluid handling aspects described herein in window assemblies having or not having a defrost assembly 17.

Turning now to the defrost assembly 17, to transmit electricity between the movable conductors 90 and guide rail conductors 102, the conductor body 88 may be arranged to provide the movable conductors 90 in contact with the contact surfaces 112 of the guide rail conductors 102. The conductor body 88 may extend beneath the downward flange 120 and into the conductor chamber 124. The movable conductors 90 may be mounted to the conductor body 88 in any suitable way for movement with the conductor body 88. In the implementations shown the movable conductors 90 include arms 132 that are coupled to the conductor body 88. The arms 132 may be coupled to the conductor body 88 in any suitable way, for example but not limited to, by slots or tabs 134, rivets 136 or other fasteners, adhesives, and/or the arms may be partially overmolded in the conductor body when the trolley 56 is formed.

In the example shown, the arms 132 are generally U-shaped with a one portion mounted to the conductor body 88 and a cantilevered or free portion 138 spaced from the conductor body and on which contacts 140 designed to engage the contact surfaces 112 are received. In the implementation shown, the arms 132 are flexible and resilient to yieldably bias contact surfaces or contacts 140 on the arms toward the contact surfaces 112 of the guide rail conductors 102. Hence, the contacts 140 may remain engaged with the contact surfaces 112 and a desired contact force may be provided between the conductors 90, 102 to ensure a desired electrical power transmission through them. The flexible arms 132 may also flex to accommodate variances in the size, shape and arrangement of the conductor body 88 and guide rail conductors 102 such as may occur within a production run of window assemblies, and may also accommodate some wear of the contacts 140 and/or guide rail conductors 102 over time without loss of electrical contact between the conductors 90, 102.

In the example where the guide rail conductors 102 are downwardly facing, the movable conductors 90 are yieldably biased upwardly, against the direction of gravitational force, and the contacts 140 are located above the lower edge 122 of the downward flange 120. Lateral movement of the movable conductors 90 toward each other may be limited by the intermediate flange 110 which may prevent engagement of the movable conductors 90 with each other or engagement of any one movable conductor 90 with both guide rail conductors 102, to prevent a short circuit of the defrost assembly 17.

The movable conductors 90 are coupled to the defrost grid 100 via the wires 96, 98 that extend from the grid 100 via connectors 141 (FIG. 6) that may be covered by a housing 143 (FIGS. 1, 2 and 6) secured to the movable pane 16. At their other ends, the wires 96, 98 are electrically communicated with the contacts 140, such as via the arms 132, as shown in the drawings, when the arms 132 are electrically conductive. The wires 96, 98 may be retained against the trolley body 72 and relative to the conductor body 88 by suitable tabs or flanges 144, as desired. This may reduce stress on the wires 96, 98 and prevent the wires from engaging the guide rail 26 which may wear the wires and/or interfere with movement of the trolley. These wires 96, 98 are of a length to permit pivoting of the movable pane 16 relative to the trolley 56 but otherwise, the ends of each of the wires 96, 98 do not move relative to each other, and the full length of the wires 96, 98 move with the movable pane 16. Further, to complete the electrical circuit, the guide rail conductors 102 may be soldered or otherwise connected to connectors 142 for power and ground wires 146, 148 (FIGS. 1, 2, 11 and 12) communicated with a vehicle power supply.

Accordingly, the electrical circuit for the defrost assembly 17 includes the vehicle power supply wires 146, 148 (power and ground) that are coupled to the guide rail conductors 102, the movable conductors 90 that are in contact with the guide rail conductors 102, and wires 96, 98 that couple the movable conductors 90 to the defrost grid 100, providing a circuit to and from the grid 100. The wires 96, 98 are separate from the vehicle supply wires 146, 148 and move with the movable pane 16 without significant relative movement between the ends of the wires such as would occur if the vehicle supply wires 146, 148 were connected at one end directly to the movable pane 16. Further, the movable conductors may oscillate within a straight portion of the guide rail and need not move along a contoured path even in implementations where the movable pane 16 moves along a contoured path. Finally, the interface between the conductors 90 and 102 may be shielded from and oriented to avoid contact by water and other contaminants to reduce fouling of the conductors. Accordingly, a relatively simple and robust assembly 10 controls the compound movement of the movable pane 16 and provides power to the defroster 17 of the movable pane while the movable pane is in and while it is moved between its open and closed positions.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. For example, relative location or orientation terms like upper, lower, side, top, bottom, left, right, upwardly, downwardly or the like are directed to the orientation of components in the drawings which represent the position of the window assembly when installed on a vehicle, and are not intended to limit the invention unless expressly noted as such a limitation. It is contemplated that the components may be oriented and arranged in other ways.

The invention claimed is:

1. A motor vehicle window assembly, comprising:
   a guide rail including a guide track
   a movable pane movable along the guide rail between a closed position and an open position;
   a defroster carried by the movable pane;
   first and second guide rail conductors carried by the guide rail, each adapted to be connected to a power source and each having a contact surface that faces away from the movable pane and downwardly, in the direction of the force of gravity; and
   first and second movable conductors each electrically communicated with a contact surface of a respective one of the first and second guide rail conductors, each of the first and second movable conductors is electrically coupled to the defroster and each is movable with the movable pane relative to guide rail when the movable pane is moved between the open and closed positions, the movable conductors being in contact with the guide rail conductors when the movable pane is in the closed position and during movement of the movable pane between the open and closed positions, and wherein the guide track faces upwardly, opposite to the direction of the force of gravity and the contact surface of each guide rail conductor is located below the movable pane relative to the direction of the force of gravity.

2. The window assembly of claim 1 wherein the contact surface of each guide rail conductor is engageable by a respective one of the movable conductors and wherein the contact surface of each guide rail conductor is separated from the guide track by a flange of the guide rail.

3. The window assembly of claim 2 wherein the flange is oriented so that liquid within the guide rail must move at least some distance in a direction against the direction of the force of gravity to engage the guide rail conductors.

4. The window assembly of claim 2 wherein the contact surface of each guide rail conductor is located above a bottom of the flange relative to the direction of the force of gravity.

5. The window assembly of claim 2 wherein the guide rail conductors are positioned within an inverted U-shaped conductor chamber that is covered on three sides by surfaces of the guide rail where one of said surfaces includes the flange.

6. The window assembly of claim 5 wherein the conductor chamber is open in a direction that is between and may include perpendicular to the force of gravity and parallel to and in the direction of the force of gravity.

7. The window assembly of claim 3 wherein the movable conductors are yieldably biased into contact with the guide rail conductors.

8. The window assembly of claim 7 wherein the biasing force is opposite to the direction of the force of gravity.

9. The window assembly of claim 1 wherein the guide rail includes a guide track that controls direction of movement of the movable pane, and the guide track has a contoured portion that is not linear and causes movement of the movable pane between a first plane and a second plane as the movable pane moves between the open position and closed position, and wherein the guide rail conductors are linear.

10. The window assembly of claim 9 which also includes a trolley received within the guide rail and coupled to the movable pane so that the trolley moves relative to the guide rail as the movable pane moves, and wherein the guide track includes a linear portion, the trolley moves along the linear portion and the first and second movable conductors are carried by the trolley for linear motion relative to the guide rail conductors as the window moves to and between the open position and the closed position.

11. A motor vehicle window assembly, comprising:
    a guide rail including a guide track that faces upwardly against the direction of the force of gravity and a flange that defines at least part of a conductor chamber;
    a movable pane guided by the guide track for movement between a closed position and an open position;
    a defroster carried by the movable pane;
    a first guide rail conductor carried by the guide rail within the conductor chamber that has a contact surface that faces downwardly, in the direction of the force of gravity and wherein the contact surface of the first guide rail conductor is located below the movable pane relative to the direction of the force of gravity;
    a power supply coupled to the guide rail conductor; and
    a first movable conductor electrically communicated with the defroster and coupled to the movable pane for movement with the movable pane, wherein the movable conductor is in contact with the contact surface of the guide rail conductor when the movable pane is in the closed position and during movement of the movable pane between the open and closed positions, and wherein the guide rail conductor is located in a portion of the conductor chamber that is separated from a liquid flow path in the guide rail by the flange.

12. The window assembly of claim 11 which also includes a wire coupled at one end to the defroster and at another end to the movable conductor, and wherein the guide rail conductor is adapted to be coupled to a power source to provide power from the power source to the defroster through the guide rail conductor, movable conductor and the wire.

13. The window assembly 13 which also includes a second guide rail conductor with one of the guide rail conductors coupled to the power source and the other of the guide rail conductors coupled to ground, and wherein the assembly also includes a second movable conductor with one movable conductor engaged with the guide rail conductor that is coupled to the power source and the other movable conductor engaged with the guide rail conductor that is coupled to ground, and two wires are provided with one wire extending between the defroster and said one movable conductor and the other wire extending between the defroster and said other movable conductor.

14. The window of claim 11 wherein the flange extends downwardly, relative to the direction of gravitational force, below the location of the guide rail conductor.

15. The window of claim 14 wherein the guide rail conductor includes a contact surface that faces downwardly.

16. The window of claim 11 wherein the conductor chamber is defined by at least three surfaces of the guide rail.

17. The window assembly of claim 11 wherein the guide track and conductor chamber share a common wall.

18. The window assembly of claim 1 wherein the guide rail includes a lower surface, and wherein the movable pane is spaced from the lower surface and the first and second guide rail conductors are positioned above the lower surface of the guide rail, and the first and second movable conductors are received between the lower surface and the first and second guide rail conductors.

19. The window assembly of claim 2 wherein the guide track is offset from the guide rail conductors in a direction transverse to the direction of gravity.

* * * * *